Patented Sept. 19, 1933

1,927,121

UNITED STATES PATENT OFFICE 1,927,121

WATER-INSOLUBLE AZO DYESTUFFS AND FIBER DYED THEREWITH

Erwin Hoffa and Erwin Thoma, Frankfort-on-the-Main-Hochst, Germany, assignors to General Aniline Works, Inc., New York, N. Y., a corporation of Delaware No Drawing. Application March 6, 1929, Serial No. 344,915, and in Germany March 10, 1928

20 Claims. (Cl. 260—95)

Our present invention relates to new water-insoluble azodyestuffs and to fiber dyed therewith, more particularly it relates to dyestuffs of the general formula:

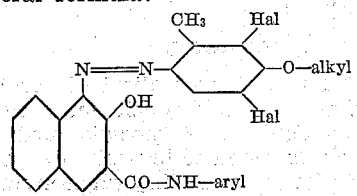

wherein the aryl radical may be substituted or not, but must not contain any group which renders the dyestuffs soluble in water, such as the sulfonic or carboxylic acid group. These compounds are obtainable by coupling diazotized 1-amino-2-methyl-4-alkoxy-3.5-dihalogen benzenes with an arylamide of the 2.3-hydroxy naphthoic acid and they can be produced in substance as well as on the fiber or on a substratum.

The new dyestuffs are remarkable for their properties as to general fastness; they are distinguished in particular by an excellent fastness to washing and to chlorine and many of them, besides being very fast to kier-boiling, answer high requirements in respect to fastness to light so that the use of the 1-amino-2-methyl-4-alkoxy-3.5-dihalogen benzenes as diazo components constitutes an important progress in the manufacture of highly valuable dyestuffs.

The 1-amino-2-methyl-4-alkoxy-3.5-dihalogen benzenes are obtainable, for instance, by halogenating the 1-nitro-2-methyl-4-alkoxy benzenes and reducing the halogenation product with, for instance, iron and a small quantity of hydrochloric acid.

The following examples serve to illustrate the invention but are not intended to limit it thereto, the parts being by weight:

(1) Cotton yarn is impregnated in known manner with a grounding liquor prepared as follows: 5 parts of 2-hydroxynaphthalene-3-carboxylic acid —β— naphthylamide, 15 parts of caustic soda solution of 28% strength, 5 parts of formaldehyde of 40% strength and 10 parts of Turkey red oil of 50% strength are dissolved in 500 parts of boiling water and the whole is made up with water to 1000 parts. The dyeing is then developed in a diazo solution obtained in the following manner: 4.1 parts of 1-amino-2-methyl-4-methoxy-3.5-dichlorobenzene are diazotized while cold with 7 parts of hydrochloric acid of 35% strength and 1.44 parts of dissolved sodium nitrite. The whole is made up to 1000 parts and sodium acetate is added until the solution shows a neutral reaction to Congo paper. The dyed material, after being washed and soaped at boiling temperature, shows a bluish bright-red tint and possesses an excellent fastness to kier-boiling and to light. The dyestuff obtained according to this example has the following formula:

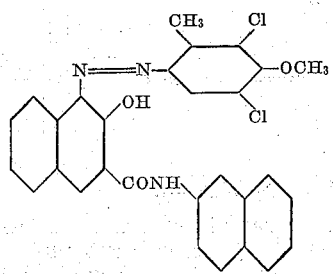

(2) Cotton yarn is impregnated in known manner with a grounding liquor prepared as follows: 10 parts of 2-hydroxynaphthalene-3-carboxylic acid —α— naphthylamide, 21 parts of Turkey red oil of 50% strength, 39 parts of caustic soda solution of 28% strength are dissolved in 500 parts of boiling water and the whole is then made up to 1000 parts. The dyeing is then developed in the diazo solution obtainable according to Example 1 and further treated as indicated in Example 1. The dyed material, after being washed and soaped at boiling temperature has a very bluish bright-red tint and possesses a very good fastness to kier-boiling and an excellent fastness to light. The dyestuff obtained according to this example has the following formula:

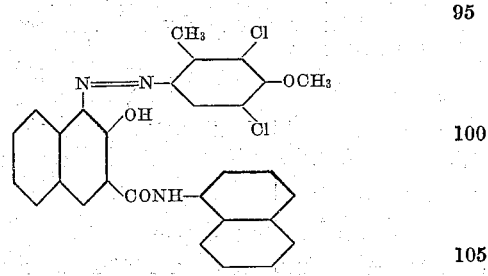

(3) When using 2-hydroxynaphthalene-3-carboxylic acid 4'-chloro-2'-methyl-1'-anilide there is obtained a scarlet dyeing of excellent fastness to kier-boiling and remarkable fastness to light. The dyestuff has the following formula:

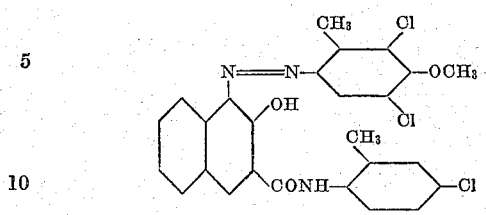

The 1-amino-2-methyl-4-methoxy-3.5-dichlorobenzene, when being recrystallized from diluted alcohol, melts at 112° C. to 113° C.

Dyestuffs similar to those described in Examples 1-3 are obtainable by using as diazo components 1-amino-2-methyl-4-methoxy-3.5-dibromobenzene or 1-amino-2-methyl-4-methoxy-3.5-dihalogen benzenes containing in 3-position and 5-position two halogen atoms different from one another. When using as diazo components instead of the said methoxy compounds the corresponding ethoxy compounds there are also obtainable dyestuffs having properties similar to those of the dyestuffs referred to in the preceding examples.

We claim:

1. Water-insoluble azo-dyestuffs of the general formula:

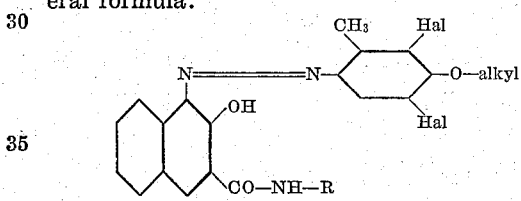

wherein R represents a radical of the benzene or naphthalene series which must not contain free sulfonic or carboxylic acid groups, forming yellowish-red to brownish-red and bluish-red powders and yielding when produced on the fiber dyeings of excellent fastness properties.

2. Water-insoluble azo-dyestuffs of the general formula:

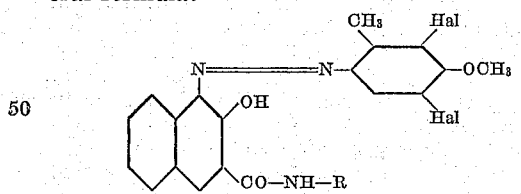

wherein R represents a radical of the benzene or naphthalene series which must not contain free sulphonic or carboxylic acid groups, forming yellowish-red to brownish-red and bluish-red powders and yielding when produced on the fiber dyeings of excellent fastness properties.

3. Water-insoluble azo-dyestuffs of the general formula:

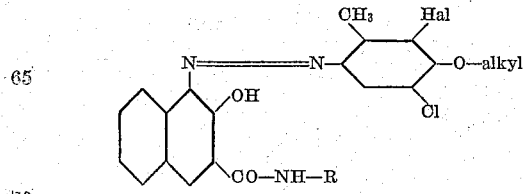

wherein R represents a radical of the benzene or naphthalene series which must not contain free sulfonic or carboxylic acid groups, forming yellowish-red to brownish-red and bluish-red powders and yielding when produced on the fiber dyeings of excellent fastness properties.

4. Water-insoluble azo-dyestuffs of the general formula:

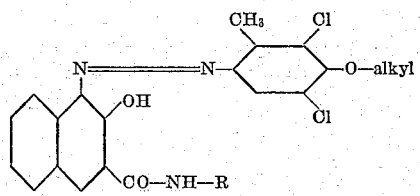

wherein R represents a radical of the benzene or naphthalene series which must not contain free sulfonic or carboxylic acid groups, forming yellowish-red to brownish-red and bluish-red powders and yielding when produced on the fiber dyeings of excellent fastness properties.

5. Water-insoluble azo dyestuffs of the general formula:

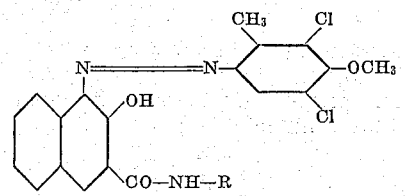

wherein R represents a radical of the benzene or naphthalene series which must not contain free sulfonic or carboxylic acid groups, forming yellowish-red to brownish-red and bluish-red powders and yielding when produced on the fiber dyeings of excellent fastness properties.

6. Water-insoluble azo dyestuffs of the general formula:

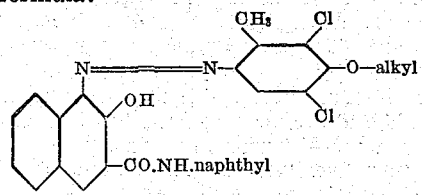

forming bluish-red powders and yielding when produced on the fiber dyeings of excellent fastness properties.

7. Water-insoluble azo dyestuffs of the general formula:

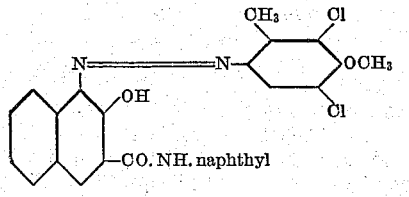

forming bluish-red powders and yielding when produced on the fiber dyeings of excellent fastness properties.

8. The water-insoluble azo dyestuff of the following formula:

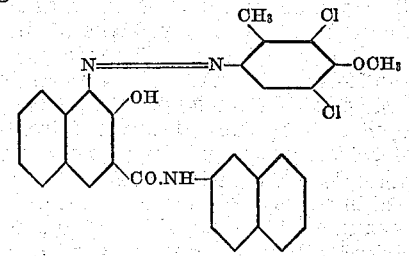

forming a bluish-red powder and yielding when produced on the fiber bluish bright-red tints of an excellent fastness to kier-boiling and to light.

9. The water-insoluble azo-dyestuff of the following formula:

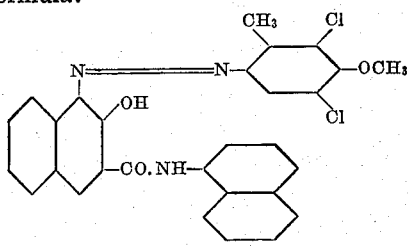

yielding when produced on the fiber a very bluish bright-red tint of a good fastness to kier-boiling and to light.

10. The water-insoluble azo-dyestuff of the following formula:

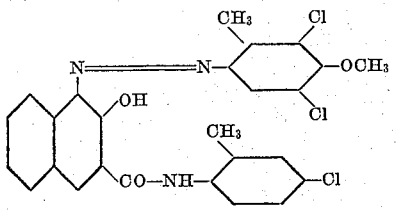

yielding when produced on the fiber a scarlet dyeing of good fastness to kier-boiling and to light.

11. Fiber dyed with the dyestuffs claimed in claim 1.
12. Fiber dyed with the dyestuffs claimed in claim 2.
13. Fiber dyed with the dyestuffs claimed in claim 3.
14. Fiber dyed with the dyestuffs claimed in claim 4.
15. Fiber dyed with the dyestuffs claimed in claim 5.
16. Fiber dyed with the dyestuffs claimed in claim 6.
17. Fiber dyed with the dyestuffs claimed in claim 7.
18. Fiber dyed with the dyestuff claimed in claim 8.
19. Fiber dyed with the dyestuff claimed in claim 9.
20. Fiber dyed with the dyestuff claimed in claim 10.

ERWIN HOFFA.
ERWIN THOMA.